Nov. 1, 1955 J. P. JONES, JR 2,722,660

PULSE CODE MODULATION SYSTEM

Filed April 29, 1952 3 Sheets-Sheet 1

INVENTOR.
JOHN PAUL JONES JR.
BY
Harry N. Saragovitz
ATTORNEY

PULSE CODE MODULATION SYSTEM

Filed April 29, 1952 3 Sheets-Sheet 2

INVENTOR.
JOHN PAUL JONES JR.
BY
Harry M. Saragovitz
ATTORNEY

Nov. 1, 1955 J. P. JONES, JR 2,722,660

PULSE CODE MODULATION SYSTEM

Filed April 29, 1952 3 Sheets-Sheet 3

INVENTOR.
JOHN PAUL JONES JR.
BY
Harry M. Saragovitz
ATTORNEY

United States Patent Office 2,722,660

Patented Nov. 1, 1955

2,722,660

PULSE CODE MODULATION SYSTEM

John P. Jones, Jr., Pottstown, Pa., assignor to the United States of America as represented by the Secretary of the Army Application April 29, 1952, Serial No. 285,036

13 Claims. (Cl. 332—11)

The present invention relates to electrical systems and more particularly to coding systems for transforming a signal into consecutive groups of code pulses indicative of consecutive values of the amplitude of the signal.

The invention will be specifically described in connection with a system in which the pulses of the code groups are arranged so as to correspond to digits of the binary system. However, it should be well understood that the invention is also applicable to systems in which the pulses of the code groups are arranged in any other desired manner whereby the repetition rate, the time-space position and/or the duration of the pulses of consecutive code groups serve to indicate the consecutive amplitude values of the signal.

It has been proposed to produce coded pulse groups indicative of the amplitude values of a known signal by means of a so-called coding tube. In its most usual form, such a coding tube consists essentially of a cathode-ray tube having a perforated target plate and a collector electrode for the electrons passing through the perforations. The target plate is perforated in a rectilinear pattern so arranged that as the cathode-ray beam scans the target plate in one direction it traverses a series of apertures corresponding to a particular code group. By successively displacing the cathode-ray beam normal to the scanning direction to other positions on the target plate as determined by the amplitude of the signal to be coded, additional code groups each representative of a specific amplitude value of the signal may be produced.

In order to allow sufficient time for the coding process, the signal to be coded is initially quantized by a suitable input circuit so that its amplitude variations are converted from a continuously varying function into a step-like function. Each successive step of this function may represent a linear variation of the amplitude of the signal to be coded or, if desired, the successive steps may represent non-linear i. e., logarithmic variations of the signal amplitude. The number of discrete levels to which the signal may be quantized is established by the capabilities of the coding system. For example, in a coding system in which the pulses are arranged so as to correspond to the digits of a binary number system and in which each code group may contain a maximum of four pulses, the signal to be coded may be quantized to 16 discrete levels. Similarly, in a binary coding system in which each code group may contain a maximum of seven pulses, the signal to be coded may be quantized to 128 discrete levels.

Pulse coding systems of the foregoing described type have been described by L. A. Meacham and E. Peterson in the Bell System Technical Journal, January 1948 at pages 1 to 43 thereof and the coding tube has been described by R. W. Sears in the accompanying article of this publication at pages 44–57 thereof.

Coding systems of the foregoing type are characterized by several important disadvantages. More particularly, the target plate of the coding tube must be made with great precision if accurately formed pulse groups are to be generated thereby. Furthermore, to prevent a false response, i. e., to insure that the proper series of apertures is selected by the scanning beam, the quantized signal applied to the tube must have accurately established step values within small tolerances and the sensitivity of the deflection system of the tube must be similarly closely controlled. In addition, suitable scanning signals and beam accelerating potentials must be supplied to the coding tube. These requirements necessitate the use of complex and space consuming auxiliary equipment which limits the coding system to relatively fixed locations and makes it unfeasable for mobile and particularly air-borne use. Another disadvantage of such prior coding systems is that the coding tube is relatively fragile and susceptible to shock thereby further restricting such prior systems from use with mobile and air-borne equipment.

It is an object of the invention to provide a pulse coding system of great precision and reliability.

A further object of the invention is to provide a pulse coding system which is compact, rugged and of low cost.

Further objects of the invention will appear as the specification progresses.

In accordance with the invention the foregoing objects are achieved by means of a novel pulse coding system comprising a pulse code generating component, by means of which the various code groups to be transmitted are simultaneously generated in a continuous manner, and an amplitude responsive selector component by means of which the so generated pulse code groups are selctively supplied to the transmission path in consecutive order as established by the amplitude of the intelligence signal applied to the amplitude selector.

In a preferred form of a system of the invention, wherein the code groups are constituted by pulses corresponding to digits of the binary number system, the pulse code generating component comprises individual circuit portions, each adapted to produce one of the pulses constituting the code groups. The pulses from each circuit portion are generated at a rate equal to a predetermined pulse group repetition rate and the pulses from the individual circuit portions are arranged with predetermined time-spaced positions relative to each other. By means of appropriate connections to the respective circuit portions, there are made available at the output of the generator a plurality of code groups, each of which may be used as a measure of a particular amplitude of the signal to be coded. In its preferred form, the system of the invention further comprises a code group selector embodying a plurality of gates which are arranged in cascade and the individual gates of which may be consecutively opened to the exclusion of the remaining gates as determined by the amplitude value of an applied control signal. By coupling each of the code groups to a different one of the gates, the code groups may be coupled to the transmission system in consecutive order as determined by the consecutive amplitude values of the control signal.

The control signal for actuating the code group selector is derived from a quantizer by means of which the variations of the signal to be coded are converted into a step-like function at a rate equal to the pulse group repetition rate.

The invention will be described in greater detail with reference to the appended drawings forming part of the specification and in which.

Figure 1:
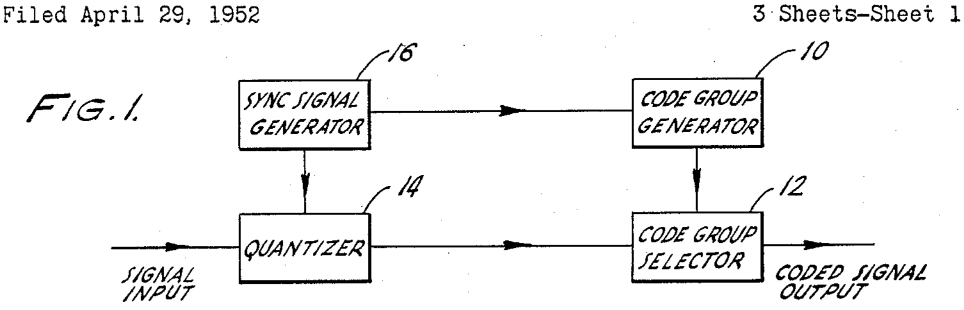
Figure 1 is a block diagram of a coding system in accordance with the invention.

Referring to Figure 1, the pulse coding system there shown comprises a code group generator 10 serving as a source of code groups which are continuously generated at a predetermined rate as established by the requirements of the system, and which are continuously available for selection. Each of the code groups may consist of one or more pulses arranged so as to correspond to the digits of the binary system so that each of the groups corresponds to a different amplitude value of the signal to be coded. In the case of a four digit binary coding system, the code groups comprise a maximum of four pulses so that 16 amplitude values of the signal to be coded may be represented. Similarly, in the case of a seven digit coding system, the code groups comprise a maximum of seven pulses permitting 128 different amplitude values of the signal to be coded to be represented. And in the general case, in an $n$ digit coding system, the code groups comprise a maximum of $n$ pulses permitting $$\sum_{p=0}^{p=n} \frac{n!}{p!(n-p)!}$$

different amplitude values of signal to be coded to be represented, where $p$ equals the number of pulses combined and may be any integer from zero to $n$. In the preferred arrangement of the invention and in the interests of simplicity and economy, the various code groups are constructed from a common source supplying the pulses at predetermined phase intervals and at the pulse group repetition rate as later to be specificaly described.

The pulse groups which are continuously available from the generator 10, as above described, are supplied to a code group selector 12, the function of which is to consecutively select the available code groups one at a time in time sequence and in an order as determined by the consecutive amplitude values of a control signal applied to the selector 12. Selector 12 may consist essentially of a plurality of gates having individual input circuits each energized by a different one of the code groups and a common output circuit from which the coded signal to be transmitted is derived. The gates are arranged in cascade and may further comprise an additional input system to which a control signal is applied for selectively opening the gates, the cascade arrangement being so devised that, for each amplitude value of the control signal, only a corresponding one of the gates is actuated and only the corresponding code group is transmitted from the generator 10 to the output of the selector.

The signal to be coded serves as a control signal for the selector 12 and is supplied thereto preferably in the form of a step-like wave. For converting the signal to be coded from a continuously varying function into a step-like function there is provided a quantizer 14 which samples the signal applied thereto at recurrent predetermined intervals, the amplitudes of the samples so taken being desirably maintained at a substanially constant value between sampling intervals in order to afford sufficient time for the subsequent coding operation. The rate at which the signal to be coded is sampled is determined by the highest frequency component thereof to be transmitted and, as a practical matter, the sampling rate should not be les than twice this highest frequency component of the signal, as is well known to those skilled in the art.

The generator 10 and the quantizer 14 are operated in synchronism and for controlling these components there is provided a synchronizing signal generator 16.

Figure 2:
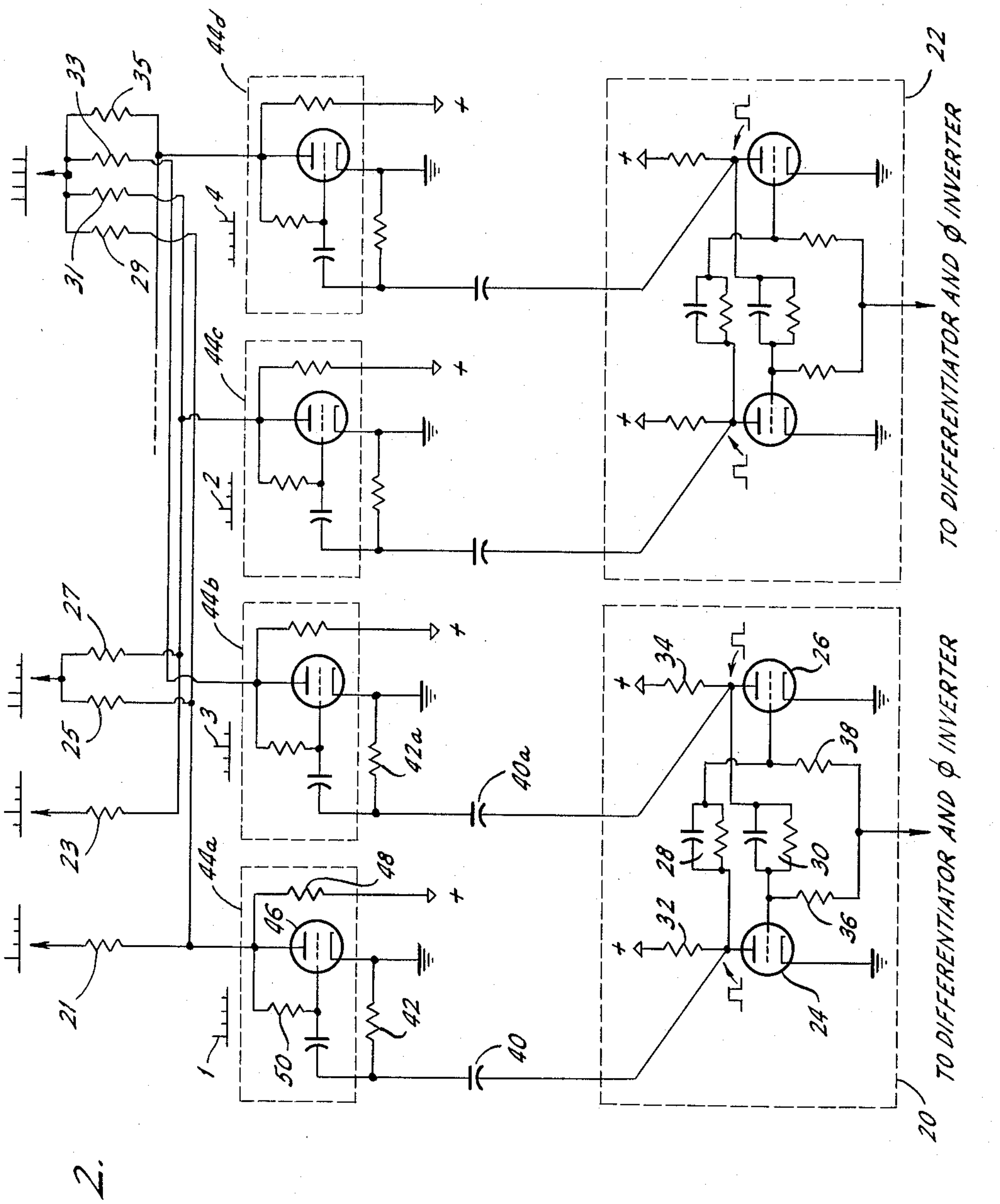
Figure 2 is a schematic diagram of one form of a pulse code group generator suitable for the system of the invention.

One specific form of a code group generator suitable for the system of the invention is shown in Figure 2. In the following description a four digt binary coding system operating at a code group repetition rate of 6 kc./sec. will be assumed. Accordingly, the generator shown in Figure 2 is constructed so as to generate four time-spaced pulses, the group repetition rate of which is equal to the said specified rate. For producing four digit code pulses, the system shown in Figure 2 comprises first and second square wave sources 20 and 22 respectively, each of which comprises an Eccles-Jordan type trigger circuit of a form well known to those skilled in the art. In the specific form shown, the oscillator 20 comprises two electron discharge tubes 24 and 26 having their anode and grid circuits interconnected by means of resistance-capacitance networks 28 and 30. The anodes of the tubes 24 and 26 are energized by a suitable source of positive potential (not shown) through load resistors 32 and 34 respectively, whereas the grids of the tubes are interconnected by grid leak resistors 36 and 38, to the junction of which a synchronizing signal for controlling the frequency and phase of the source is applied.

As later will be more fully discussed, the synchronizing signal applied to the source 20 has a frequency equal to twice the repetition rate of the pulse code groups. In the specific example herein illustrated the frequency of the synchronizing signal is equal to 12 kc./sec.

At the anode of tube 24 a first square wave at a frequency of 6 kc./sec. is obtained. This wave, when applied to a differentiating network consisting of a capacitor 40 and a resistor 42, produces short duration voltage pulses coincident with the leading and lagging edges of the square wave. The negative going differentiated pulses are selected by a clipper tube system 44a also serving as an isolation amplifier, and appearing in the output circuit of the clipper system as a positive going pulse indicated by the reference numeral 1.

The design of the isolation amplifier-clipper 44a conforms to standard practice and, in the arrangement shown, consists of a triode electron discharge tube 46, the anode of which is energized from a source of positive potential (not shown) through a resistor 48, and the grid of which is normally maintained at a positive bias value through a grid leak resistor 50 connected to the anode.

At the anode of the tube 26 a second square wave is obtained which is 180° out of phase from the square wave produced at the anode of tube 24. This second square wave is similarly applied to a differentiating network 40a—42a and thereafter supplied to an isolation amplifier-clipper 44b to produce an output positive going pulse indicated by the numeral 3.

The source 22 is identical to source 20 and the anodes thereof supply two additional square waves phased 180° relative to each other. These square waves, in turn, are differentiated in the manner above described and, by means of isolation amplifier-clippers 44c and 44d, produce two positive going pulses indicated by the numerals 2 and 4 respectively.

The respective time-phase positions of the pulses 1, 3, 2 and 4 appearing at the outputs of the clippers 44a, 44b, 44c and 44d have been indicated by the diagrams arranged adjacent to the clippers. It will be noted that the pulses occur at uniform intervals throughout the duration of the pulse group, i. e., consecutive pulses are spaced 90° apart.

To produce this quadrature relationship between the pulses 1 and 3 on the one hand and the pulses 2 and 4 on the other hand, the source 22 is made to operate in quadrature to the source 20. This is readily accomplished by adjusting the synchronizing signals supplied to the sources 20 and 22 so that these signals are phase displaced 180° relative to each other.

By means of suitable isolation resistors coupled to the outputs of the amplifier-clippers the four spaced pulses 1, 2, 3 and 4 are arranged in various binary digit combinations to produce a plurality of pulse code groups, each code group corresponding to a different amplitude value of the signal to be coded. More particularly, the code group 1, 0, 0, 0 may be derived from the generator by means of an isolation resistor 21 coupled to the output of amplifier-clipper 44a. The code group 0, 1, 0, 0 may be derived from the generator by means of an isolation resistor 23 coupled to the output of amplifier-clipper 44c; the code group 1, 1, 0, 0 may be derived at the junction of isolation resistors 25 and 27 which are coupled to the outputs of amplifier-clippers 44a and 44c respectively. In similar manner, code groups with the digit pulses arranged in the various other combinations are produced by combining the outputs of one or more of the amplifier-clippers. For the sake of completeness, the code group 1, 1, 1, 1 which represents the maximum capability of the particular generator described, has been illustrated. This pulse group, as will be noted, may be produced by combining the outputs of all of the amplifier-clippers through isolation resistors 29, 31, 33 and 35.

The four-digit system herein described, makes available 15 different pulse groups by means of which 16 different amplitude values of the signal to be coded may be represented.

Figure 3:
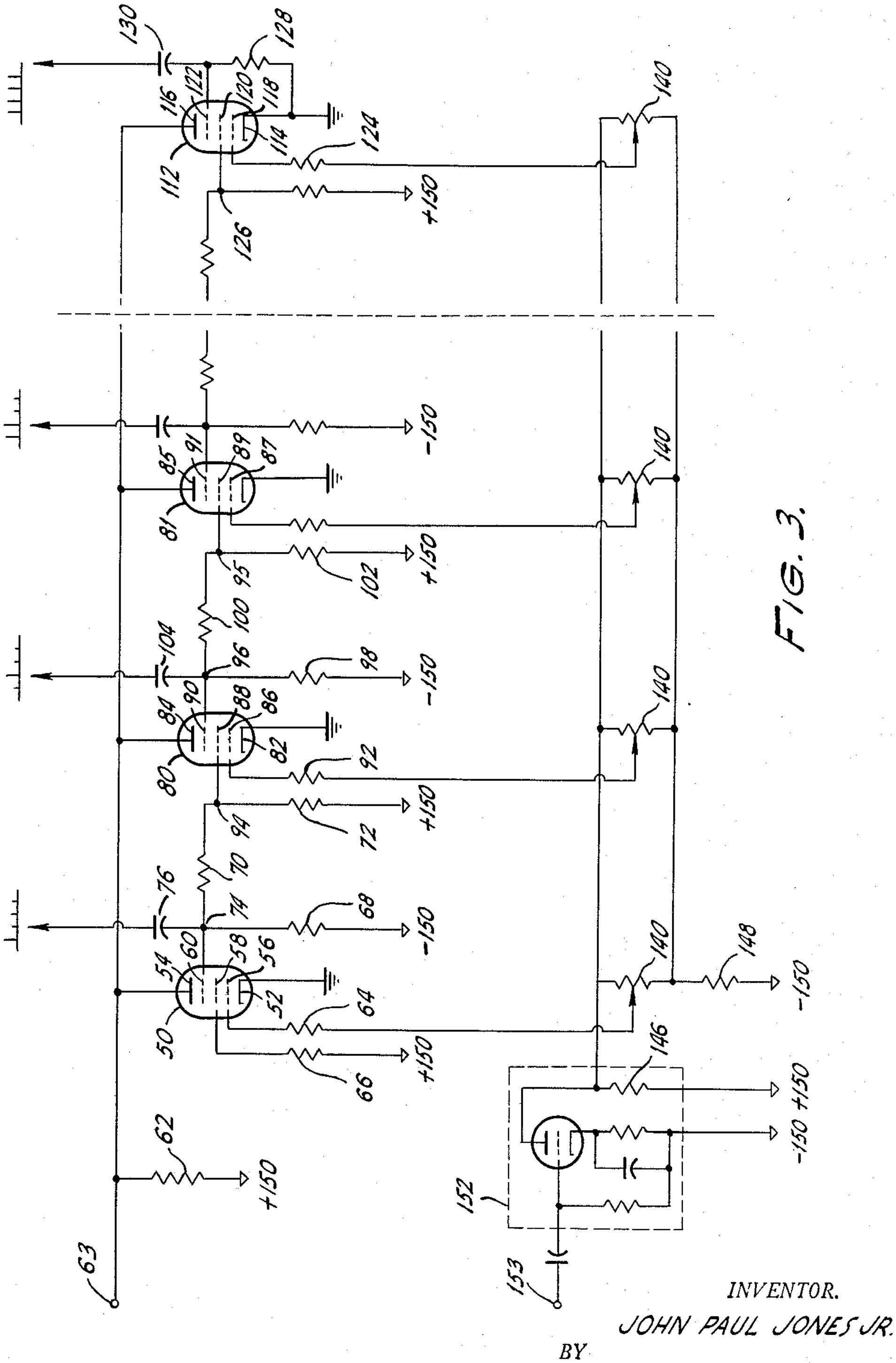
Figure 3 is a schematic diagram of one form of a code group selector suitable for the system of the invention.

A particularly effective code group selector for the coding system of the invention, is shown in Figure 3. In the form shown, the selector comprises a plurality of gates which are connected in cascade and each of which, when suitably actuated, is adapted to supply a different one of the code groups to a common output system. For the binary coding system herein specifically described, the selector comprises 15 gates, each for a different one of the code groups produced by the generator of Figure 2. For purposes of simplification only the first three gates and the last gate of the cascade system are shown.

The first of the gates of the selector shown comprises an electron discharge tube 50 having a cathode 52, an anode 54 and first, second and third grids 56, 58 and 60 respectively. Cathode 52 is connected to a point at ground potential whereas the anode 54 is connected to a source of positive potential +150 through a load resistor 62. The grid 56, serving as a first control grid for the tube 50, is energized by the control signal applied to the selector through a grid resistor 64, in a manner later to be described, whereas the grid 58, serving as a screen grid, is connected to a source of positive potential +150 through a screen voltage dropping resistor 66. The grid 60, serving as a second control grid, is coupled to a junction 74 of a resistive network comprising resistors 68, 70, and 72 connected in series relationship across a source of potential (not shown), the opposite poles of which are at −150 and +150 volts with respect to ground potential. The second control grid 60 is further coupled through a capacitor 76 to the code group generator at a point of the generator producing the code group corresponding to the first of the amplitude values to be indicated, i. e., to the free end of resistor 21 (see Figure 2) at which point the code group 1, 0, 0, 0 is available.

The second gate of the selector comprises an electron discharge tube 80 having a cathode 82, an anode 84 and first, second and third grid electrodes 86, 88, and 90 respectively. Cathode 83 is connected to a point at ground potential whereas the anode 84 is connected in common with the anode 54 of the tube 50 to the load resistor 62. The grid 86, serving as a first control grid, is energized by the control signal applied to the selector in a manner later to be more fully described through a grid resistor 92, whereas grid 88 is connected to the junction 94 of the resistors 70 and 72. The grid 90, serving as a second control grid, is coupled to a junction 96 of a resistive network comprising resistors 98, 100 and 102 connected in series relationship across a source of potential (not shown), the opposite poles of which are at −150 and +150 volts with respect to ground potential. The second control grid 90 is further coupled through a capacitor 104 to the code group generator at a point of the generator producing the code group corresponding to the second of the amplitude values to be indicated; i. e., to the free end of resistor 23 (see Figure 2) at which point the code group 0, 1, 0, 0 is available.

The third and succeeding gates, with the exception of the last gate of the cascade system, are constituted in the manner above described in connection with the second gate and are coupled in cascade in the same manner as described in connection with the first and second gates. Similarly, the second control grids of each of these gates are each connected to a different one of the points of the generator at which the various other code groups are available. In the case of the third gate, the second control grid thereof is connected to the junction of the resistors 25 and 27 (see Figure 2) at which point the code group 1,1,0,0 is available.

The last of the series of gates constituting the selector comprises an electron discharge tube 112 having a cathode 114 connected to a point at ground potential, an anode 116 connected in common with the anode 54 of the tube 50 to the load resistor 62, and first, second and third grid electrodes 118, 120 and 122 respectively. The grid 118 is energized by the control signal for the selector through a grid resistor 124 in a manner later to be more fully described, whereas grid 120 is connected to the junction 126 of a resistive network (shown in part); the latter network being similar to the resistor network 68, 70 and 72 and the resistor network 98, 100 and 102 previously described and being similarly connected across a source of potential (not shown), the opposite poles of which are at −150 and +150 volts with respect to ground potential. The grid 122, serving as a second control grid, is provided with a D. C. return to the cathode by means of grid resistor 128 and is coupled through a capacitor 130 to the code group generator at a point thereof producing the code group corresponding to the largest amplitude value to be indicated; i. e., to the common junction of resistors 29, 31, 33 and 35, at which point the code group 1,1,1,1 is available.

The system so far described, operates to selectively open each of the gates to the exclusion of the others so that the code groups applied to the second control electrodes may be selectively made to appear across the common load resistor 62 as determined by the amplitude value of the control signal applied to the first control electrodes of the gates. For this purpose the first control electrodes of each of the tubes 50, 80, etc., are supplied with progressively negative bias voltages so that tube 50 conducts only when the grid 56 thereof is energized by a positive going potential exceeding a given value; tube 80 conducts only when the grid 86 thereof is energized by a positive going potential exceeding the first mentioned potential by a given amount; tube 81 conducts only when the grid 87 thereof is energized by a positive going potential exceeding the conduction of potential of tube 80 by a given amount, and finally tube 112 conducts only when the grid 118 thereof is energized by a positive going potential exceeding the conduction potential of the preceeding tube in the cascade system by another given value.

In a four digit binary coding system of the type herein specifically described, which is capable of defining fifteen discrete amplitude values in addition to the value zero, the bias potentials applied to the first control grids of the successive gates are adjusted to increasing incremental values as established by the maximum peak value of the control signal applied to the selector and by the desired coding relationship. For example, assuming that the signal to be coded has a maximum value of 15 volts and a linear coding relationship is to be maintained, then the first control grid of tube 50 may be operated at a negative potential equal to the sum of the cut-off bias value of the tube plus one volt, the first control grid of tube 80 is operated at a negative potential equal to the sum of the cut-off bias value plus two volts, the control grid of the third tube of the cascade series is operated at a negative potential equal to the sum of the cut-off bias plus three volts, etc., until finally the control grid of the last tube is operated at a negative potential equal to the sum of the cutoff bias plus fifteen volts. When other coding relationships are used, i. e., a logarithmic relationship, the increments between the biasing potentials of the first control grids of the succeeding tubes of the cascade system differ by amounts which are logarithmically related.

The bias potentials for the first control grids of the successive tubes are established by individual potentiometers 140 which are connected in shunt relationship and form part of a resistor network further constituted by a series resistor 146 and a second series resistor 148. The series network so formed is connected across a source of potential (not shown), the opposite poles of which are at −150 and +150 volts with respect to ground potential. By adjusting the tapping position of the potentiometers, the bias potentials of the succeeding tubes of the selector may be adjusted to the desired values as above discussed.

The control signal for the selector is applied to the first control grids of the tubes by means of an isolation amplifier 152, the load impedance of which is constituted by the above mentioned resistor 146. It will be apparent to those skilled in the art that by applying a signal to the input of amplifier 152 a corresponding change is effected in the output circuit of the amplifier so that, for increasingly negative values of the signal applied to the amplifier, the voltage across resistor 146, and hence the voltages applied to the first control grids of the tubes, become increasingly positive in value. Thus, for a signal of given amplitude level applied to the amplifier 152, one or more of the first control grids of the consecutive tubes 50, 80, etc., will attain potential values such as normally to bring about conduction through the tubes, the number of consecutive tubes following the tube 50 which are placed in this condition being determined by the amplitude of the applied input signal.

The selector of Figure 3 is arranged so that only one of the gates is open at a time as determined by the amplitude of the applied signal, i. e., only the last of those tubes of the series in which the first control grids are raised to a potential greater than the cut-off value of the tubes. More particularly, and assuming for the moment that a signal is applied to amplifier 152 of such magnitude that the control grids 56 and 86 of the tubes 50 and 80, respectively, are both raised to potentials greater than the cut-off values of these tubes as initially established by the positions of the movable arms of the potentiometers 140 and that the signal amplitude is not sufficient to cause conduction in any of the succeeding tubes of the cascade system, under these conditions tubes 50 and 80 would normally conduct and open the paths between the second control grids 60 and 90 respectively to the common output terminal. However, in order for the selector to perform its required function in accordance with the invention, it is necessary that the path through tube 50 be maintained in a closed condition and that only the path through tube 80 be opened.

In the system shown, this selective gating is brought about in the following manner: By reason of the positive going signal applied to control grid 86 of tube 80 there is produced a current flow to the second grid 88 of this tube since this grid is operated at a positive potential. The resultant voltage drop through the resistor 72 causes a drop in the potential of junction 94 which brings about a drop in the potential of junction 74. In practice the resistors 68, 70 and 72 are adjusted to values at which the voltage at junction 74 is normally insufficient to produce cut-off in tube 50, and becomes greater than the cut-off value when the potential of junction 74 is depressed by the current flow to the grid 88 of tube 80.

Similarly, when the amplitude of the signal applied to input amplifier 152 has a value such that the first control grids of the tubes 50, 80 and 81 are made sufficiently positive to place these tubes in conducting condition, only the path between the second control grid 91 and the anode 85 is opened. In this instance, the current flow through the tube 81 is accomplished by conduction to the grid 89 thereof which is operated at positive potential through the resistor 102. The accompanying voltage drop in resistor 102 disturbs the initial voltage distribution at junctions 95 and 96 causing the potential of junction 96 to assume a relatively large negative value and thereby close the signal path between the control grid 90 and the anode 84. It will also be noted that, notwithstanding the fact that a conductive path to anode 84 is prevented by the negative potential so applied to grid 90, there occurs nevertheless a current flow between cathode 82 and the positive grid 88 of the tube 80 because of the positive going potential applied to grid 86 by the input signal. This current flow to the grid 88 lowers the potential of junction 94 and causes junction 74 to attain a potential sufficiently negative to cut off the flow of current to the anode 54 of tube 50.

The remaining gates in the cascade system operate in the manner above described so that only one gate is opened at a time, the preceding gates biased at a first control grid cut-off potential lower than that of the opened gate being maintained in closed condition by reason of the increased negative potentials applied to their second control grids by succeeding gates, and the gates following the conducting gate in the series being maintained closed by reason of the fact that the applied signal amplitude is insufficient to overcome the cut-off bias applied to the first control grids thereof.

The last gate of the series can open only when the amplitude of the control signal attains its maximum value. Accordingly, the second control grid 122 thereof serves only as an input electrode for the code group applied to this gate and the said grid may be operated at a fixed potential which may be the potential of cathode 114 as shown.

Figure 4:
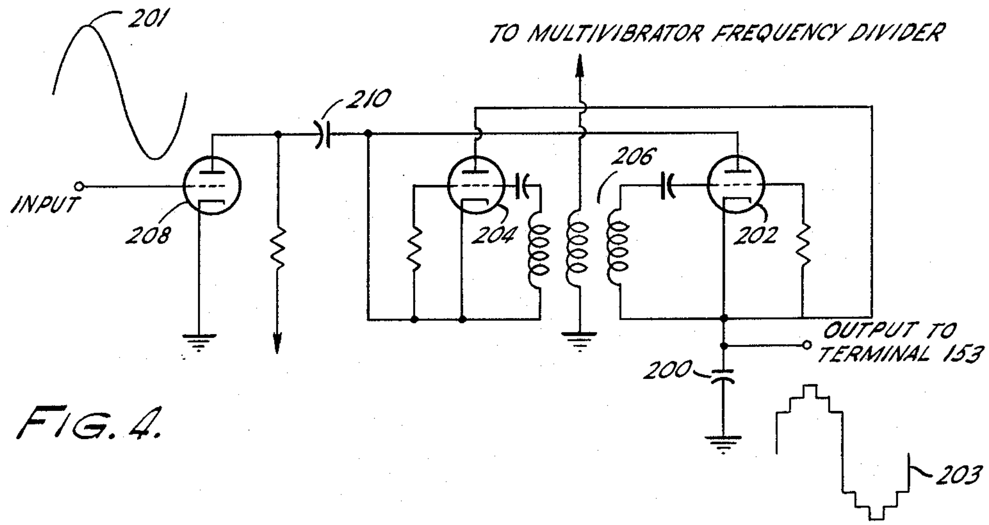
Figure 4 is a schematic diagram of one form of a quantizer suitable for the system of the invention.

In order to allow sufficient time for the complete transmission of each of the code groups to the output terminal 63 of the selector, the signal applied to amplifier 152 during the coding period, should not undergo amplitude variations greater than the increments between the bias voltages supplied by the potentiometers 140. Preferably, during the coding intervals, the control wave is maintained at constant amplitude values in the manner of a stepwave and such a wave may be derived from the signal to be coded by means of a quantizer of the type shown in Figure 4. The quantizer there shown comprises a storage capacitor 200 adapted to be periodically charged and discharged by means of electron discharge tubes 202 and 204.

The signal to be coded is applied to the quantizer through a suitable isolation amplifier 208 and a blocking condenser 210. It will be noted that each of the tubes 202 and 204 is effectively in series with the storage capacitor 200, the tube 202 having its cathode connected to capacitor 200 and its anode connected to capacitor 210 whereas the tube 204 is coupled with its anode to capacitor 200 and its cathode to capacitor 210, so that the signal applied through capacitor 210 is the only voltage appearing on the plates and cathodes of the tubes. Tubes 202 and 204 are actuated at the repetition rate of the code groups, i. e., at a rate of 6 kc./sec. The actuating signal is preferably in the form of gating pulses of short duration which are applied to the tubes through a transformer 206 having individual output winding connected to the control grid of the respective tubes.

When the signal applied to capacitor 210 has a positive going value, and when a gating pulse is applied to the grid of tube 202 through the transformer 206, a charge in a given direction is produced on the capacitor 200, the magnitude of the charge being determined by the contemporaneous amplitude of the input signal. Negative going variations of the signal applied to capacitor 210 similarly cause tube 204 to conduct during the occurrence of the gating pulses so that the charge on the capacitor 200 is accordingly modified proportionally to the change in the amplitude of the input signal occurring in the intervals between the successive gating pulses. During the time between pulses neither of the tubes 202 nor 204 is conductive so that the voltage across capacitor 200 remains constant. By so periodically charging and discharging the capacitor 200, an input signal having a wave form such as shown at 201 may be converted into an output control signal for the selector having a step-like wave form such as shown at 203.

Figure 5:
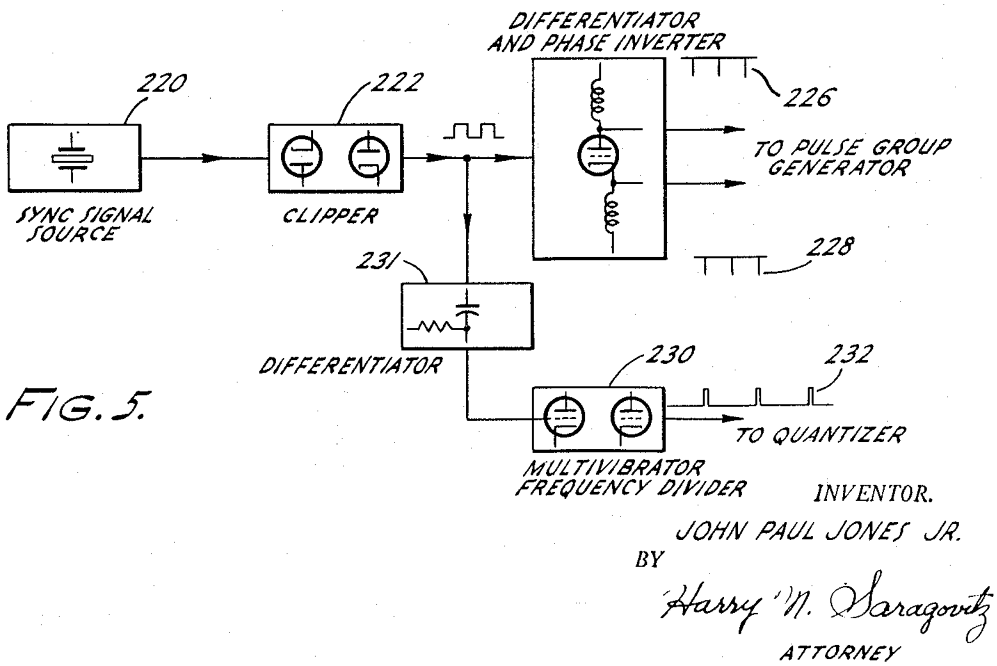
Figure 5 is a detailed block diagram of one form of a signal source for synchronizing the operations of the code group generator and the quantizer of Figures 2 and 4 respectively.

The code group generator and the quantizer are synchronized by a synchronizing signal generator, one suitable form of which is shown in Figure 5. The generator there shown comprises a wave source 220 of conventional form which, for the purpose of stability, may be a piezo-electric crystal controlled oscillator and which, for the purpose of simplicity, operates at a frequency equal to twice the pulse group repetition rate, i. e., at 12 kc./sec. The output of the source 220 is applied to a suitable amplitude-clipper 222, diagrammatically illustrated as a dual diode clipper, to produce a square wave signal. The square wave signal so produced is supplied by a first path to a differentiating and phase inverting network 224 by means of which two trains of differentiated pulses recurring at the rate of 12 kc./sec. and phased 180° apart, as shown at 226 and 228, are produced. These pulses are applied to the pulse group generator, i. e., to the sources 20 and 22 (see Figure 2) and control and synchronize the operation thereof as previously described. The wave at the output of clipper 222 is supplied by a second path to a multivibrator frequency divider 230 of conventional form, by means of which a train of short duration pulses are produced. These pulses, which are shown at 232 and which have a repetition rate equal to the gating frequency of the quantizer (i. e., 6 kc./sec.), are applied to the transformer 206 (see Figure 4) to control and synchronize the operation of the quantizer. To facilitate the operation of the multivibrator 230, the synchronizing signal applied thereto is preferably in the form of short duration pulses produced, for example, by means of a differentiating network 231.

While the invention has been described with specific reference to a four digit binary coding system, it is readily apparent that the invention is also applicable to binary coding systems utilizing a different number of digits per code group. More particularly, by providing a code group generator adapted to produce pulses at a greater rate per coding period and by appropriately modifying the code group selector (i. e., by increasing the number of selector gates to conform to the greater definition so made available), a binary coding system based on the use of more than four digits per code group may be effected. Nor is the invention restricted to coding systems in which the pulses represent digits of the binary number system. In this latter connection, it will be noted that the system of the invention may be adapted to the use of code groups constructed in any desired manner so as to represent different amplitude values of the signal to be coded. In such a modification of the invention there may be provided a series of code group generators, each continuously generating a different code group of predetermined configuration at the desired coding rate which code groups are supplied to the selector in the manner above described so as to be selectively supplied to the output of the system in a sequence established by the amplitude variations of the signal to be coded.

While I have described my invention by means of specific examples and in a specific embodiment, I do not wish to be limited thereto for obvious modifications will occur to those skilled in the art without departing from the spirit and scope of the invention.

What I claim is:

1. Apparatus for transforming a signal into consecutive pulse code groups representative of consecutive amplitude values of said signal, comprising means to simultaneously generate in a continuous manner a plurality of pulse code groups, each of said groups being representative of a different amplitude value of said signal, and means responsive to said signal to consecutively select said code groups, each of said selected code groups being representative of the contemporaneous amplitude value of said signal.

2. Apparatus as claimed in claim 1 wherein said code groups are generated at a given rate and said signal responsive means selects said code groups at said given rate.

3. Apparatus for transforming a signal into consecutive pulse code groups representative of the amplitude values of said signal at consecutive time-spaced intervals, comprising means to sample said signal at consecutive intervals recurring at a given repetition rate to thereby produce a quantized control wave having amplitude variations in the form of discrete steps, means to simultaneously generate, in a continuous manner and at a repetition rate equal to said given rate, a plurality of pulse code groups, each representative of a different step value of the amplitude of said control wave, and means responsive to said control wave to consecutively select said code groups, each of said selected code groups being representative of the contemporaneous amplitude value of said control wave.

4. Apparatus as claimed in claim 3 wherein said selecting means comprises a plurality of gates, each of said gates being selectively operative to the exclusion of the others of said gates as determined by the amplitude of said control wave, a plurality of input paths, each coupled to a different one of said gates, means to supply to each of said input paths a different one of said code groups, and a common output path for said gates.

5. Apparatus as claimed in claim 3 wherein said control wave has a given maximum number of discrete steps, wherein the pulses of the said groups occupy predetermined time-spaced positions and the maximum number of combinations of the pulses of said groups is equal to the said maximum number of discrete steps, wherein said code group generator comprises individual circuit portions each producing a different one of said pulses, and wherein said means to supply to each of said paths a different one of said code groups comprises means to couple each of said input paths to selected ones of said circuit portions.

6. Apparatus for transforming a signal into consecutive pulse code groups representative of the amplitude values of said signal at consecutive time-spaced intervals, comprising means to sample said signal at consecutive intervals recurring at a given repetition rate to thereby produce a quantized control wave having amplitude variations in the form of discrete steps, means to simultaneously generate in a continuous manner and at a repetition rate equal to said given rate a plurality of pulse code groups, the pulses of which correspond to digits of the binary number system, selector means having a plurality of input channels and a common output channel, means to apply a different one of said pulse groups to a respective one of said input channels, and means to apply said control wave to said selector, said selector means comprising means responsive to said control wave to couple a discrete one of said input channels to said output channel to the exclusion of the others of said input channels.

7. Apparatus as claimed in claim 6 wherein the said selector comprises a series of gates arranged in cascade between a first terminal gate and a last terminal gate, each of the gates intermediate said terminal gates comprising an electron discharge device having a cathode, an anode, first and second control electrodes arranged between said cathode and anode and an auxiliary electrode arranged intermediate said control electrodes, wherein the anodes of said gates are coupled in common to the said output channel, wherein the said control wave is coupled to the said first control electrodes of said gates, wherein the said input paths are coupled to a respective one of said second control electrodes, and wherein the said auxiliary electrode of each of the said gates is coupled to the second control electrode of the preceding gate of said series and applies a blocking signal to the said second electrode of the said preceding gate upon current flow between a cathode and auxiliary electrode of the succeeding gate.

8. Apparatus as claimed in claim 6 wherein the said pulse group generator comprises a source adapted to generate a plurality of signals having a substantially square wave form and phase displaced relative to each other and further comprising means to convert said square wave signals into pulses having a duration less than the period of said square wave signals.

9. A code group generator comprising $n$ sources of waves of the same frequency but of different phase, where $n$ is an integer greater than 1, $n$ means, each for deriving from an input wave a pulse coincident with a given phase angle of said input wave, each of said means being supplied from a different one of said sources, and a plurality of output circuits respectively supplied by the outputs of one or more of all said means for respectively combining said outputs to simultaneously obtain up to $$\sum_{p=1}^{p=n} \frac{n!}{p!(n-p)!}$$

different combinations of pulses at said output circuits while maintaining fixed their phase displacement from one another, where $p$ equals the number of pulses combined and may be any integer from one to $n$.

10. A generator as set forth in claim 9, wherein said sources provide square waves and said $n$ means are responsive to a given maximum change of slope of said square waves.

11. A code group generator comprising four sources of symmetrical square waves of the same frequency but in phase quadrature, means connected to each source for deriving from each square wave a pulse of given polarity coincident with a given change of direction of said wave, whereby the outputs of said means comprise pulses of like polarities time phase spaced 90° apart, and a plurality of output circuits for combining the outputs of said last means, one at a time; two at a time, three at a time, and four at a time, respectively whereby 15 possible combinations of pulses are obtained.

12. A code group generator comprising a source of first synchronizing pulses, a source of second synchronizing pulses of the same repetition frequency as said first pulses but 180° out of phase therewith, a first doubly stable multivibrator triggered by said source of first pulses for producing two square wave outputs 180° out of phase with one another, a second doubly stable multivibrator triggered by said source of second pulses for producing two square wave outputs 180° out of phase with one another, four pulse generators, each generator being connected to receive a separate square wave output of said multivibrators for deriving from the lagging edge of each square wave pulse, and a plurality of circuits for combining the outputs of said pulse generators one at a time, two at a time, three at a time, and four at a time, respectively.

13. A code group selector comprising a plurality of sources, each source providing a different pulse code group of one or more pulses, a like plurality of gate circuits, each of said circuits being connected to a different one of said sources, means providing a signal to be encoded, means coupled to said last named means and responsive to different amplitudes of said signal for opening different ones of said gate circuits, and means responsive to the opening of some of said gate circuits for closing a previously opened gate circuit.

References Cited in the file of this patent

UNITED STATES PATENTS

| | | |
|---|---|---|
| 2,272,070 | Reeves | Feb. 3, 1942 |
| 2,409,229 | Smith, Jr., et al. | Oct. 15, 1946 |
| 2,437,707 | Pierce | Mar. 16, 1948 |
| 2,438,908 | Goodall | Apr. 6, 1948 |
| 2,529,666 | Sands | Nov. 14, 1950 |
| 2,531,846 | Goodall | Nov. 28, 1950 |
| 2,541,039 | Cole | Feb. 13, 1951 |
| 2,570,220 | Earp et al. | Oct. 9, 1951 |
| 2,579,302 | Carbrey | Dec. 18, 1951 |
| 2,605,361 | Cutler | July 29, 1952 |
| 2,662,113 | Schouten et al. | Dec. 8, 1953 |